Jan. 22, 1963 C. K. COLE 3,074,573
DUMPING MECHANISM FOR TRUCK CARRIED DETACHABLE CONTAINER
Filed Jan. 11, 1962 3 Sheets-Sheet 1

INVENTOR
CLAYTON K. COLE
BY Herbert Q. Minturn
ATTORNEY

Jan. 22, 1963  C. K. COLE  3,074,573
DUMPING MECHANISM FOR TRUCK CARRIED DETACHABLE CONTAINER
Filed Jan. 11, 1962  3 Sheets-Sheet 3

INVENTOR
CLAYTON K. COLE
BY Herbert Q. Weinturn
ATTORNEY

United States Patent Office 3,074,573
Patented Jan. 22, 1963

3,074,573
DUMPING MECHANISM FOR TRUCK CARRIED
DETACHABLE CONTAINER
Clayton K. Cole, Kalamazoo, Mich., assignor to
Golay & Co., Inc., Cambridge City, Ind.
Filed Jan. 11, 1962, Ser. No. 165,553
6 Claims. (Cl. 214—315)

This invention relates to means for handling a container which may be picked up and placed on the chassis of a truck and also be removed therefrom and set down on any suitable support. It also relates to means for tipping the container into a dumping position without removing it from the truck.

Detachable containers have been used in conjunction with a truck or hauling device for sometime and the invention does not reside in that feature per se. The invention does reside particularly in the structure for rocking the container in order to permit the contents to spill over from one end or side and then lowering the empty container back onto the carrying vehicle.

It is a purpose of the invention to provide a structure which is exceedingly simple and free of complications so that the structure may be employed under rough hauling conditions, and further that there be the minimum number of parts to wear and require replacement. These and many other objects and advantages of the invention will become obvious to those versed in the art in the following description of one particular form of the invention as illustrated in the accompanying drawings, in which FIG. 1 is a view in side elevation of a structure embodying the invention in relation to a vehicle;

Figure 1:
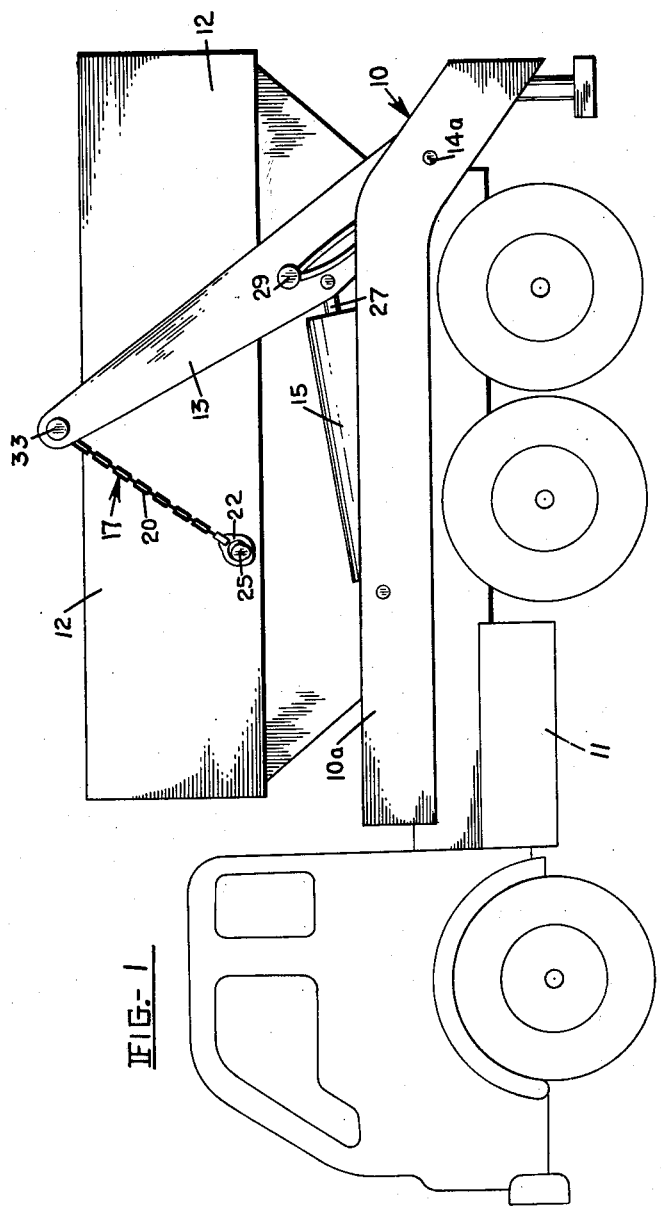

A frame of any suitable nature designated in general by the numeral 10 is mounted on a vehicle herein shown as a truck 11. This frame extends along opposite sides of the truck chassis, that is there is the left hand portion 10a and the right hand portion 10b of the frame on opposite sides. There is room between these frame side members to receive a container 12 therebetween to rest in any suitable manner upon the chassis.

Each of these frame side portions 10a and 10b carry respectively an arm 13 and an arm 14 rockably pivoted to the frame at the rear portion thereof to rock about the pivot generally designated by the numeral 14a, FIG. 1. Preferably, and not specifically entering into the invention, the frame portions 10a and 10b are bifurcated to receive the arms 13 and 14 within the bifurcations. In each instance, the arms 13 and 14 extend normally upwardly and forwardly to positions indicated by that of the arm 13, FIG. 1. Normally these arms 13 and 14 will be rocked around rearwardly by means of a hydraulic cylinder 15 in turn rockably attached to the frame 10 forwardly of the arms, these arms being given a rocking travel as best indicated in FIG. 3, where the arm 13 is indicated as having traveled from the full line position to the dash line position.

With the container 12 positioned as indicated in FIG. 1, and also the arms 13 and 14 rocked to that angle illustrated by the angle of the arm 13, there is a cross member 16 extending across the container 12 and carried by each upper end portion of the arms 13 and 14. This member 16 may be rockably carried by the arms 13 and 14 through arm-attached stubs 33 and 34.

Figures 3, 4, 5:
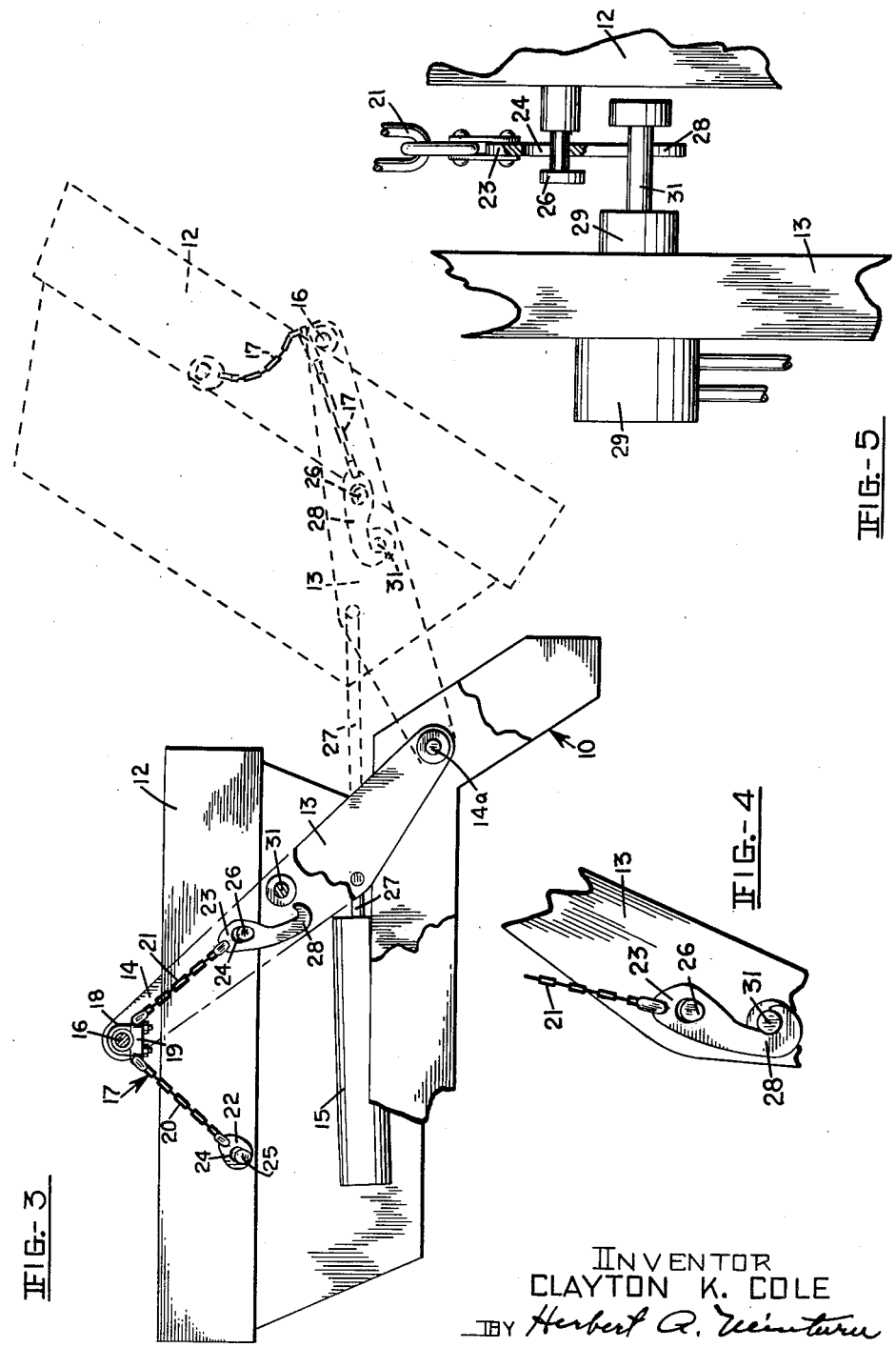
FIG. 3 is a view in side elevation, on a reduced scale, of a detachable container and fragmentary portions of the container handling mechanism.
FIG. 4 is a detail illustrating a container engaged hook engaging a rocker arm pivot means.
FIG. 5 is a view on an enlarged scale in rear elevation of the means for intercepting the rocker hook.

As indicated in FIGS. 1 and 3, the cross member 16 will be in close proximity with the upper edges of the container 12. Each arm 13 and 14 carries by the stubs 33 and 34, on the outsides of the container 12, a sling generally designated by the numeral 17. These slings have a central mounting each on the ends of the stubs 33 and 34. This mounting consists of a U bolt 18 engaged over the respective stubs and carrying a cross bar 19 against the underside of the stub in each instance. In the form herein shown, this member 19 is rigidly carried against the stub so that the U bolt 18 and this member 19 are fixed against travel therearound. A pair of chains 20 and 21 have common ends rockably secured to outer ends of the bar 19. Each of the other outer ends of the chains 20 and 21 has fixed thereto an eye plate 22 and 23 respectively. Each eye plate 22 and 23 has a hole 24 therethrough of sufficient size which will loosely receive therethrough respectively posts 25 and 26 secured to the sides respectively of the container 12.

When these eye plates 22 and 23 are thus engaged with the posts 25 and 26, the arms 13 and 14 upon being rocked by the piston rod 27 of the hydraulic cylinder 15 will lift the container 12 from the chassis through the slings 17 and permit the container to be carried on rearwardly of the chassis.

Each of the eye plates 23 which in the present showing are the rearmost eye plates in respect to the front end of the container 12 is elongated into a hook formation 28. The open side of the hook 28 is directed rearwardly as indicated in FIG. 3 particularly. In the normal operation of picking up the container 12 and placing it on the truck chassis, this hook end 28 performs no function. However it comes into operation in dumping the contents from the container 12.

Figure 2:
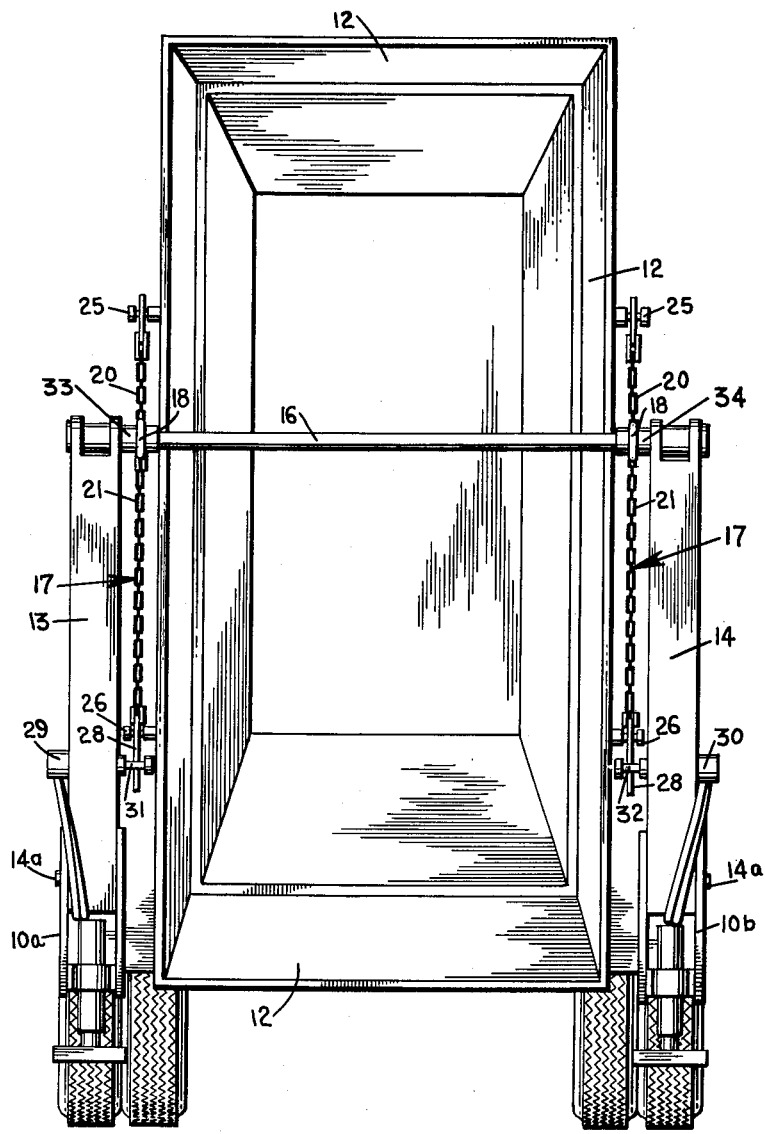
FIG. 2 is a view in rear end elevation of the structure showing the detachable container in a dumping position.

Each of the arms 13 and 14 carries a hydraulic cylinders 29 and 30 respectively to have a connecting rods 31 and 32 respectively directed by hydraulic pressure within the cylinders 29 and 30 toward the opposite sides of the container 12, FIG. 2. These rods 31 and 32 may be retracted so as to be out of the path of the hooks 28 when the container 12 is to be removed from the chassis and to be replaced thereon. However in the dumping operation in going from the normal horizontally carried position of the container 12, to the dash line position as indicated in FIG. 3, these cylinders 29 and 30 are pressurized from any suitable means carried by the vehicle on which the container 12 is carried. Thus when the cylinders 29 and 30 are pressurized, the rods 31 and 32 are extended one toward the other and toward the opposite sides of the container 12.

The arms 13 and 14 are then rocked from their forwardly directed positions to rearwardly directed positions as indicated in FIG. 3.

In this travel of these arms 13 and 14, the container 12 is lifted free of the chassis, through the slings 17 and carried rearwardly until the arms 13 and 14 have been rocked to those positions whereby the hooks 28 will come into contact with the rods 31 and 32 in each instance whereupon the container 12 will be tipped to have its rear end carried around downwardly with the chains 21 maintaining the hooks 28 in contact with the rods 31 and 32 with the final result that the container 12 tips over to rest against the cross member 16, FIG. 3, and is held in that dash line position indicated in FIG. 3. The engagement of the hooks 28 with the rods 31 and 32 prevent the container 12 from sliding downwardly as it bears against the cross member 16, and this dumping position is maintained until the arms 13 and 14 are rocked around forwardly to bring the container 12 back into its normal horizontal position seated on the chassis. In this position, the hooks 28 will have traveled forwardly from contact with the rods 31 and 32 to a sufficient distance to permit the rods 31 and 32 to be retracted if so desired. Of course if the container 12 is to be permitted to remain on the chassis, then the rods 31 and 32 may remain extended.

Thus it is to be seen that I have provided an exceedingly simple mechanism for handling a detachable container and for tipping it for dumping all without having to be worried by non-engagement of dumping mechanisms as was heretofore been the case. Furthermore, extreme accuracy of location of parts is not required and no appendages have to be added to the container other than the normal lifting posts 25 and 26. Variations in dimensions of different containers does not affect the operation so long as the hook members are carried in the paths of the hydraulically extended rods 31 and 32. The free ends of the piston rods 31 and 32 may extend into close proximity with the sides of the container 12 to serve as means limiting the side sway of the container.

Reference has been made above to use of the cross member 16. The cross member 16 is employed when large containers 12 are used to carry exceedingly heavy loads. In the case of lighter containers and loads being handled, the cross member 16 is generally omitted, in which case the slings 17 are still carried by the stubs 33 and 34 as in FIG. 2, and the chains of the slings 17 limit the over-turning of the container 12.

Therefore it is to be seen that I have produced a device which is extremely low relatively in cost of production and also in cost of operation, so that handling of the containers and dumping them may be had with a high degree of reliability and freedom from stoppages in operation. Therefore I do not desire to be limited to the precise form herein shown and described, particularly in relation to the sling members 20 and 21 which may be made out of flexible cable rather than chains if so desired, beyond the limitations which may be imposed by the following claims.

I claim:
1. The combination with a carrier,
an arm rockably mounted by a lower end portion thereof on each side of said carrier,
means simultaneously rocking said arms,
a container detachably carried by said carrier between said arms,
a pair of slings carried one at the upper portion of each of said arms,
said slings having two flexible members normally hanging downwardly, one sling on each side of the container and detachably engaging it by said flexible members at approximately horizontally spaced apart zones, whereby the container may be lifted and carried toward an end of the carrier by the slings upon suitable rocking of said arms;
of a hook carried by each of two of said flexible members of said slings, and
a member carried by each of said arms in the paths of said hooks,
said hooks being directed toward and engaging said members upon travel of the container toward said carrier end, causing the container to swing by said hooks about the members into a tilted, dumping position.

2. The structure of claim 1, in which said sling-to-container engagement includes
an eye plate carried by said flexible members,
said hooks extending from one each of two of said eye plates on those flexible members located between the other eye plates and said carrier end, and
a pair of posts approximately horizontally spaced apart and fixed one each in said zones on each side of container to extend therefrom, and
said eye plates detachably engaging said posts.

3. The structure of claim 1 in which there is a cross member between and carried by the upper ends of said arms; the lengths of said arms and the positioning of said cross member thereon is such that it constitutes a top in the path of the tilting container limiting said swinging thereof wherein the container bears against the cross member in said dumping position.

4. The structure of claim 1, in which there is means reciprocating said members into and out of said hook paths,
said members having lengths to extend across said paths and toward sides of said container restraining the container against travel laterally between said arms.

5. The structure of claim 2 in which
each of said eye plates is rockable on said posts, and
each of said hooks extends rigidly from their respective eye plates and are centered on the center lines of the hook carrying sling flexible members when under tension with the open sides of the hooks presented toward said members.

6. The structure of claim 1 in which said hook carrying flexible member, each has a length with its attached hook which substantially equals the distance from the attachment of said slings at the upper portions of the arms to said arm carried member.

References Cited in the file of this patent
UNITED STATES PATENTS

| | | |
|---|---|---|
| 2,290,738 | Chadwick | July 21, 1942 |
| 2,313,514 | Brooks | Mar. 9, 1943 |